United States Patent
Golgiri et al.

(10) Patent No.: US 11,946,751 B2
(45) Date of Patent: Apr. 2, 2024

(54) DETERMINING A VEHICLE ROUTE

(71) Applicant: Ford Global Technologies, LLC, Dearborn, MI (US)

(72) Inventors: Hamid M. Golgiri, Livonia, MI (US); Tony Tae-Jin Pak, Garden City, MI (US); Ahmed Benmimoun, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 17/746,035

(22) Filed: May 17, 2022

(65) Prior Publication Data

US 2023/0392937 A1 Dec. 7, 2023

(51) Int. Cl.
*G01C 21/34* (2006.01)
*G01C 21/36* (2006.01)

(52) U.S. Cl.
CPC ..... *G01C 21/3415* (2013.01); *G01C 21/3461* (2013.01); *G01C 21/3676* (2013.01); *G01C 21/3685* (2013.01)

(58) Field of Classification Search
None
See application file for complete search history.

(56) References Cited

U.S. PATENT DOCUMENTS

| | | | |
|---|---|---|---|
| 10,777,080 B2* | 9/2020 | Chen | G08G 1/123 |
| 2016/0055302 A1* | 2/2016 | Sellars | G16H 50/20 |
| | | | 705/3 |
| 2020/0130676 A1* | 4/2020 | Smid | G05D 1/0231 |
| 2020/0180607 A1* | 6/2020 | Choi | G08G 1/146 |
| 2021/0122361 A1 | 4/2021 | Sugano | |

FOREIGN PATENT DOCUMENTS

CN 112073142 A 12/2020

* cited by examiner

*Primary Examiner* — Hongye Liang
(74) *Attorney, Agent, or Firm* — Frank A. MacKenzie; Bejin Bieneman PLC

(57) ABSTRACT

A system includes a first computer and a second computer. The first computer is programmed to receive a request from the second computer to move a vehicle from a first location to a second location and synchronize a timer stored in each of the computers. The first computer determines a route including waypoints from the first location to the second location and determines predicted travel times for legs of the route. The predicted travel times include a first predicted travel time for a first leg defined from the first location to a first waypoint included in the waypoints and the first computer transmits the route and the travel times to the second computer. The second computer is programmed to determine an elapsed time of travel and predict a location of the vehicle based on the elapsed time of travel and the first predicted travel time.

16 Claims, 4 Drawing Sheets

DETERMINING A VEHICLE ROUTE

BACKGROUND

A vehicle can be equipped with electronic and electro-mechanical components, e.g., computing devices, networks, sensors, controllers, etc. A vehicle computer can acquire data regarding the vehicle's environment and can operate the vehicle or at least some components thereof based on the acquired data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated.

DETAILED DESCRIPTION

Figure 1:
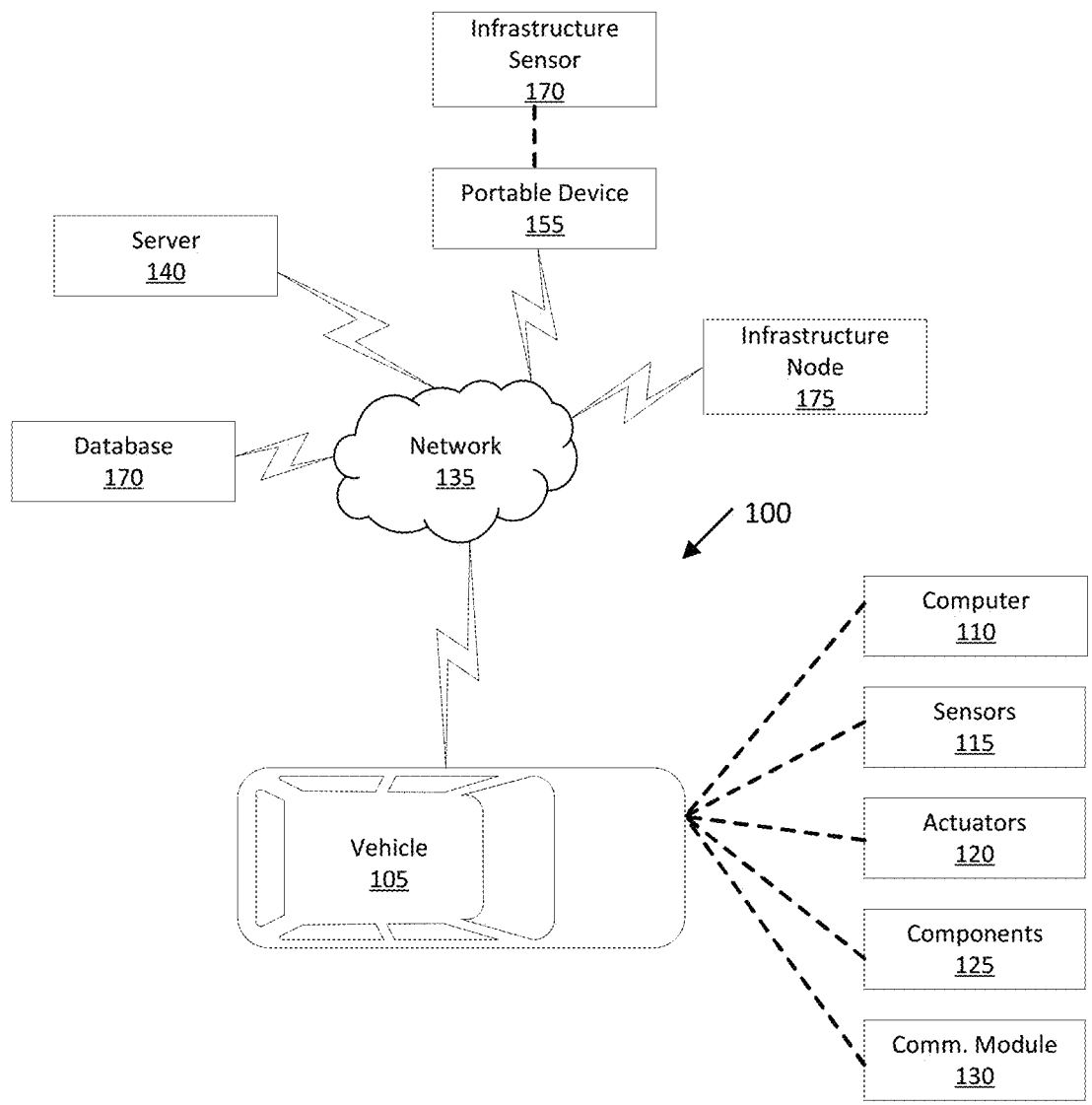
FIG. 1 is a block diagram illustrating an example vehicle control system for a vehicle.

A system for a vehicle includes a first computer including a first processor and a first memory, the first memory storing first instructions executable by the first processor to receive a request from a second computer to move the vehicle from a first location to a second location within a predetermined area. The first instructions include to synchronize a first timer stored in the first computer with a second timer stored in the second computer. The first instructions include to determine a route including one or more waypoints from the first location to the second location. The first instructions include to determine predicted travel times for a plurality of respective legs of the route. The predicted travel times include a first predicted travel time for a first leg, wherein the first leg is defined from the first location to a first waypoint included in the one or more waypoints. The first instructions include to transmit the route and the travel times to the second computer. The second computer includes a second processor and a second memory, the second memory storing second instructions executable by the second processor to determine an elapsed time of travel based on the synchronization of the first timer and the second timer. The second instructions include to predict a location of the vehicle based on the elapsed time of travel and the first predicted travel time.

The second instructions may include instructions to predict the location of the vehicle further based on a second predicted travel time included in the predicted travel times.

The second instructions may include instructions to compare the elapsed time of travel to a sum of the predicted travel times and calculate a confidence score based on the comparison of the elapsed time of travel and the sum of the predicted travel times.

The first instructions may include instructions to determine an updated route based on obstacles detected along the route as the vehicle moves.

The first instructions may include instructions to transmit the updated route to the second computer.

The first instructions may include instructions to determine updated predicted travel times between the waypoints based on obstacles detected along the route as the vehicle moves.

The first instructions may include instructions to transmit the updated predicted travel times to the second computer.

The obstacles may be detected by infrastructure sensors in the predetermined area identifying the location of the obstacles.

The second location may be identified by infrastructure sensors in the predetermined area.

The second location may specify a parking spot.

The parking spot may be specified based on data from infrastructure sensors in the predetermined area.

The route may be determined based on a map of the predetermined area and vehicle sensor data.

The first instructions may include instructions to determine updated predicted travel times based on obstacles detected along the route as the vehicle moves.

The first instructions may include instructions to transmit the updated predicted travel times to the second computer.

The waypoints may be determined based on operation of the vehicle.

The operation of the vehicle may include at least one of turning, accelerating, parking, or stopping of the vehicle.

With reference to the Figures, wherein like numerals indicate like parts throughout the several views, a system 100 for a vehicle 105 includes a first computer 110 including a first processor and a first memory, the first memory storing first instructions executable by the first processor to receive a request from a second computer 155 to move the vehicle 105 from a first location P1 to a second location P2 within a predetermined area 145. The first instructions include to synchronize a first timer stored in the first computer 110 with a second timer stored in the second computer 155. The first instructions include to determine a route including one or more waypoints T1, T2, T3 from the first location P1 to the second location P2. The first instructions include to determine predicted travel times for a plurality of respective legs L1, L2, L3, L4 of the route. The predicted travel times include a first predicted travel time for a first leg L1, wherein the first leg L1 is defined from the first location P1 to a first waypoint T1 included in the one or more waypoints T1, T2, T3. The first instructions include to transmit the route and the travel times to the second computer 155. The second computer 155 includes a second processor and a second memory, the second memory storing second instructions executable by the second processor to determine an elapsed time of travel based on the synchronization of the first timer and the second timer. The second instructions include to predict a location of the vehicle 105 based on the elapsed time of travel and the first predicted travel time.

The vehicle 105 may automatically maneuver within a parking area, e.g., a structure or lot, in the process of automatically valet parking. A user may submit a request to either park a vehicle 105 in the lot or retrieve a vehicle 105 from the lot. The request may be sent by a portable device 155, e.g., a cellular device, tablet, computer, etc. The location of the vehicle 105 may be tracked within the lot to notify the user where the vehicle 105 is along its path to and end point, either the user or a parking location. Along the way, the route R may have waypoints T1, T2, T3 that are predetermined where the time between waypoints T1, T2, T3 is known. The location is predicted based on the legs L1, L2, L3, L4 between the waypoints T1, T2, T3 and travel times to get from one waypoint T1, T2, T3 to the next. The location is then transmitted to the user to notify the user where the location is located along the route R.

Turning now to FIG. 1, the vehicle 105 includes the vehicle computer 110, sensors 115, actuators 120 to actuate various vehicle components, and a vehicle 105 communications module. The communications module allows the vehicle computer 110 to communicate with a remote server computer 140, and/or other vehicles 105, e.g., via a messaging or broadcast protocol such as Dedicated Short-Range Communications (DSRC), cellular, and/or other protocol that can support vehicle-to-vehicle, vehicle-to infrastructure, vehicle-to-cloud communications, or the like, and/or via a packet network.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor data and/or communicating the sensor 115 data. In another example, the vehicle computer 110 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components. For purposes of this disclosure, an autonomous mode is defined as one in which each of vehicle propulsion, braking, and steering are controlled by the vehicle computer 110; in a semi-autonomous mode the vehicle computer 110 controls one or two of vehicle propulsion, braking, and steering; in a non-autonomous mode a human operator controls each of vehicle propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle 105 communications network 135 such as a communications bus as described further below, more than one processor, e.g., included in electronic controller units (ECUs) or the like included in the vehicle 105 for monitoring and/or controlling various vehicle components, e.g., a transmission controller, a brake controller, a steering controller, etc. The vehicle computer 110 is generally arranged for communications on a vehicle 105 communication network 135 that can include a bus in the vehicle 105 such as a controller area network (CAN) or the like, and/or other wired and/or wireless mechanisms.

Via the vehicle network 135, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle 105 communication network 135 may be used for communications between devices represented as the vehicle computer 110 in this disclosure. Further, as mentioned below, various controllers and/or sensors 115 may provide data to the vehicle computer 110 via the vehicle 105 communication network 135.

Vehicle sensors 115 may include a variety of devices such as are known to provide data to the vehicle computer 110. For example, the sensors 115 may include Light Detection And Ranging (LIDAR) sensor(s), etc., disposed on a top of the vehicle 105, behind a vehicle 105 front windshield, around the vehicle 105, etc., that provide relative locations, sizes, and shapes of objects surrounding the vehicle 105. As another example, one or more radar sensors fixed to vehicle 105 bumpers may provide data to provide locations of the objects, second vehicles, etc., relative to the location of the vehicle 105. The sensors 115 may further alternatively or additionally, for example, include camera sensor(s), e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle 105, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors. The sensors 115 can be mounted to any suitable location in or on the vehicle 105, e.g., on a vehicle 105 bumper, on a vehicle 105 roof, etc., to collect images of the environment around the vehicle 105.

The vehicle actuators 120 are implemented via circuits, chips, or other electronic and or mechanical components that can actuate various vehicle subsystems in accordance with appropriate control signals as is known. The actuators 120 may be used to control components, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI). The HMI includes user input devices such as knobs, buttons, switches, pedals, levers, touchscreens, and/or microphones, etc. The input devices may include sensors 115 to detect user inputs and provide user input data to the vehicle computer 110. That is, the vehicle computer 110 may be programmed to receive user input from the HMI. The user may provide each user input via the HMI, e.g., by selecting a virtual button on a touchscreen display, by providing voice commands, etc. For example, a touchscreen display included in an HMI may include sensors 115 to detect that a user selected a virtual button on the touchscreen display to, e.g., select or deselect an operation, which input can be received in the vehicle computer 110 and used to determine the selection of the user input.

The HMI typically further includes output devices such as displays (including touchscreen displays), speakers, and/or lights, etc., that output signals or data to the user. The HMI is coupled to the vehicle 105 communications network 135 and can send and/or receive messages to/from the vehicle computer 110 and other vehicle 105 sub-systems.

In addition, the vehicle computer 110 may be configured for communicating via a vehicle-to-vehicle communication module 130 or interface with devices outside of the vehicle 105, e.g., through a vehicle 105-to-vehicle (VV) or vehicle-to-infrastructure (VX) wireless communications (cellular and/or DSRC., etc.) to another vehicle 105, and/or to a remote server computer 140 (typically via direct radio frequency communications). The communications module could include one or more mechanisms, such as a transceiver, by which the computers of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module include cellular, Bluetooth, IEEE., dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer 110, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE., vehicle-to-vehicle (VV) such as Dedicated Short-Range Communications (DSRC), etc.), local area networks 135 (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

Figure 2:
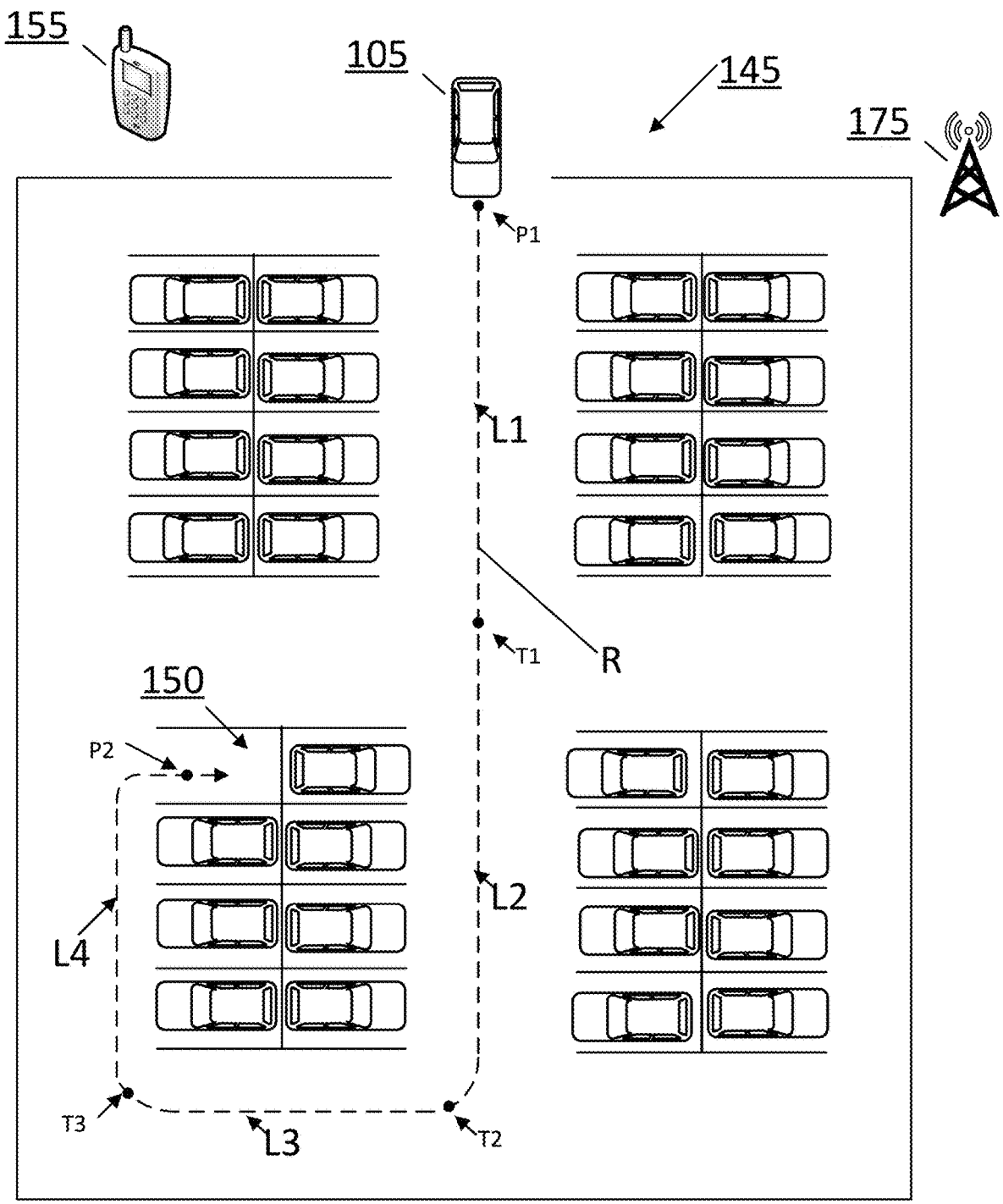
FIG. 2 is a diagram illustrating operating the vehicle according to the system of FIG. 1.

FIG. 2 is a diagram illustrating a vehicle 105 operating within a predetermined area 145, i.e., an example parking area, that includes parking spaces for vehicles 105. The predetermined area 145 is a specified area of ground surface for parking a vehicle 105. The predetermined area 145 may be on a street or road, e.g., an area alongside a curb or an edge of the street, a parking lot, structure, or portion thereof, etc. A sub-area may, for example, be a parking spot 150 indicated by conventional markings, e.g., painting lines on a ground surface.

A user of the vehicle 105 may use a portable device 155, e.g., a cellular device (e.g., a smartphone), tablet, handheld computer, laptop computer, etc., to submit a move message that includes a move request to move the vehicle 105 in the predetermined area 145. The portable device 155 could include a second computer (with a second computer processor and memory). The portable device 155 may further include various sensors such as one or more cameras, an accelerometer, and a location sensor, e.g., to determine a location according to the Global navigation satellite system (GNSS) or Global Positioning System (GPS), a microphone, etc. The portable device 155 could use any suitable wireless communications, such as cellular or WI-FI, to communicate with a central computer via a wide area network. The portable device 155 may further use the suitable wireless communications to communicate with the vehicle computer 110.

The vehicle computer 110 can receive the move message from the portable device 155. The move request transmitted from the portable device 155 to the vehicle computer 110 includes a request to move the vehicle 105 in the predetermined area 145. The request may include a first location P1, i.e., an origin of the vehicle 105, and a second location P2, i.e., a destination for the vehicle 105. In the example shown in FIG. 2, the first location P1 is the entrance to the predetermined area 145 and the second location P2 is an identified open parking spot 150 in the predetermined area 145. In such an example, the parking spot 150, i.e., second location P2, may be identified in any suitable way, e.g., by a table or the like in a database 170 accessible via the network 135 as shown in FIG. 1. The database 170 can store data specifying, on a real-time or near real-time basis, parking spots 150 that are available in the predetermined area 145, infrastructure sensors 160 in the predetermined area 145, etc. In other examples, the first location P1 may be the parking spot 150 and the second location P2 may be the entrance to the predetermined area 145.

After the move request is received by the vehicle computer 110, the vehicle computer 110 can synchronize a timer or clock with a timer or clock of the portable device 155. For ease of reference, in the illustrated example we say that the vehicle computer 110 includes a first timer and the portable device 155 includes a second timer. That the first and second timers are synchronized means that elapsed times output by the respective first and second timers will be substantially the same as (i.e., will match, with any difference due to processing latency, network latency, etc.) each other. Alternatively or additionally, clocks could be synchronized. Once the timers are synchronized, the timers may be transmitted to the portable device 155 to be used in later determinations by the portable device 155, e.g., as further described below.

The vehicle computer 110 can determine a route R within the predetermined area 145. The route R is determined based on the request by the user on the portable device 155. The route R can be determined based on a determination of the first location P1 and the second location P2.

The route R as illustrated in FIG. 2 extends from the first location P1 to the second location P2 through the predetermined area 145. The route R is determined such that the vehicle 105 can maneuver through the predetermined area and avoid non-destination parking spots and/or obstacles in the predetermined area 145. The route R may be determined based on a map of the predetermined area 145 and vehicle sensor 115 data. The map may be stored in any suitable manner. For example, the map may be stored in the vehicle computer 110 and/or in a computer or data store accessible via the network 135, e.g., database 170, a portable device 155, a computing device associated with an infrastructure node 175. The infrastructure sensors 160 may be supported by the infrastructure node 175. The route R within the map may be determined according to any suitable routing algorithm, e.g., by determining a shortest-distance traveled between an origin and a destination.

The route R includes one or more waypoints T1, T2, T3 from the first location P1 and the second location P2. A waypoint T1, T2, T3 is a location along the route R over which the vehicle 105 passes. In the example shown in FIG. 2, the route R includes three waypoints T1, T2, T3. In other examples, the route R may include any suitable number of waypoints T1, T2, T3 between the first location P1 and the second location P2. The number of way points may be dependent at least in part on the length of the route R. For example, the longer the route R, the more waypoints T1, T2, T3 the route R may include. Other factors, e.g., time of day, weather conditions, number of turns necessary, etc., may change the number of waypoints T1, T2, T3 along the route R.

As discussed above, the waypoints T1, T2, T3 are locations along the route R. The waypoints T1, T2, T3 may be locations on the map of the predetermined area 145, such as longitude/latitude coordinates, previously identified points in the predetermined area 145, determined by operation of the vehicle 105, e.g., at least one of turning, accelerating, parking, or stopping of the vehicle 105, etc. In other words, the locations of the waypoints T1, T2, T3 and the number of waypoints T1, T2, T3 may change depending on the route R determined for the vehicle 105. The length of the route R, number of turns along the route R, location of the first location P1 and the second location P2, whether there are obstacles along the route R, etc. may be used in determining the location and number of the waypoints T1, T2, T3 along the route R. The waypoints T1, T2, T3 are chosen to segment the route R into route segments, as described further below, to allow determination of the location of the vehicle 105 along the route R as the vehicle 105 moves along the route R. The waypoints T1, T2, T3 and route segments allow for the route R to be broken into portions such that the location of the vehicle 105 may be determined along the route R relative to the waypoints T1, T2, T3 and the entire route R rather than only relative to the entire route R.

The waypoints T, T2, T3 may be determined in any suitable way. For example, existing techniques can be used to determine where along the route R waypoints T1, T2, T3 are present, how many waypoints to include, etc. For example, the A* search algorithm, the travelling salesman problem algorithm, Dijkstra's algorithm, mixed rural postman problem algorithm or any other suitable algorithm may be used to determine a suitable route R, e.g., length, and waypoints T1, T2, T3 along the route R. In other examples, changes in movement of the vehicle 105, e.g., turning or steering, may eliminate or add waypoints T1, T2, T3 along the route R in real time as the vehicle 105 moves along the route. Any unexpected events along the route R may cause new waypoints T1, T2, T3, as described further below, may also change or add waypoints T1, T2, T3 along the route R.

The waypoints T1, T2, T3 define route segments or legs L1, L2, L3, L4 along the route R between the first location P1 and the second location P2. A sum of the distances of the legs L1, L2, L3, L4 is the distance of the route R from the first location P1 to the second location P2. For example, in FIG. 2, a first leg L1 is between the first location P1 and the first waypoint T1, a second leg L2 is between the first waypoint T1 and the second waypoint T2, a third leg L3 is between the second waypoint T2 and the third way point, and a fourth leg L4 is between the third waypoint T3 and the second location P2.

The vehicle computer 110 can determine a predicted travel time for each of the legs L1, L2, L3, L4, i.e., an amount of time predicted for the vehicle 105 to travel along the respective leg L1, L2, L3, L4. In other words, as an example, the predicted travel time for the first leg L1 of the route R is the predicted amount of time for the vehicle 105 to travel from the first location P1 to the first waypoint T1.

The vehicle computer 110 can send a route message specifying the route R to the portable device 155 and may also send the predicted travel times between the waypoints T1, T2, T3. The route message may include data about the route R specifying the points P1, P2 and/or waypoints T1, T2, T3, legs L1, L2, L3, L4, etc.

The portable device 155 can also determine an elapsed time of travel for the vehicle 105. The elapsed time is the travel time from when the request is received by the vehicle computer 110 and the vehicle 105 begins to move to the present. The synchronization of the timers may be used such that the elapsed time from when the vehicle 105 begins to move will match an elapsed time determined, if necessary, by the vehicle computer 110. The portable device 155 displays the elapsed time since the vehicle 105 began moving.

The portable device 155 may compare the predicted travel time to a waypoint T1, T2, T3 and the elapsed time to predict the location of the vehicle 105 along the route R. In other words, the location of the vehicle 105 along the route R is predicted based on the predicted travel time to one of the waypoints T1, T2, T3 and the elapsed time since the vehicle 105 began moving. For example, the predicted travel time of legs L1, L2, L3, L4 could be compared to an elapsed travel time, whereupon the vehicle 105 could be predicted to be on one of the legs L1, L2, L3, L4 for which the elapsed travel time most nearly is less than. The portable device 155 can likewise determine the predicted location of the vehicle 105 based on the elapsed time of travel and the predicted travel times between the waypoints T1, T2, T3. The portable device 155 may display the predicted location along the route R as the vehicle 105 moves based on the elapsed time determined by the portable device 155.

The portable device 155 may determine a confidence score by comparing the elapsed time to the sum of the predicted travel times for each of the legs L1, L2, L3, L4. The confidence score may be used by the vehicle computer 110 to determine the likelihood of the actual location of the vehicle 105 being the same as the predicted location of the vehicle 105. The confidence score may be calculated in any suitable way. In some examples, confidence in the location of the vehicle 105 along each of the legs L1, L2, L3, L4 may decrease as the time increases. In such examples, the confidence score may be calculated as a function of the time the vehicle 105 has been moving along each leg L1, L2, L3, L4. For example, the confidence score may be calculated as:

$$f(t)=1/t$$

In other examples, such as examples including infrastructure sensors 160, historical patterns and data regarding the length of time of travel of vehicles along the route R or real time information about the predetermined area 145 may be used to determine the confidence score for the location of the vehicle 105. The historical patterns and data may be used to adjust the predicted location of the vehicle 105 due to changes in the velocity or other parameters of the vehicle 105.

The transmission from the vehicle computer 110 to the portable device 155 may be adjusted based on the confidence score. The scale of the confidence score may vary depending on the technique used to calculate the confidence score. For example, the scale of the confidence score may range from, for example, 0 to 1, 0 to 10, or 0 to 100. The confidence score may indicate the vehicle 105 may be lagging along the route R. The transmission rate may be adjusted to predict the location of the vehicle 105. For example, a higher transmission rate may increase the confidence score and a lower transmission rate may decrease the confidence score.

Figure 3:
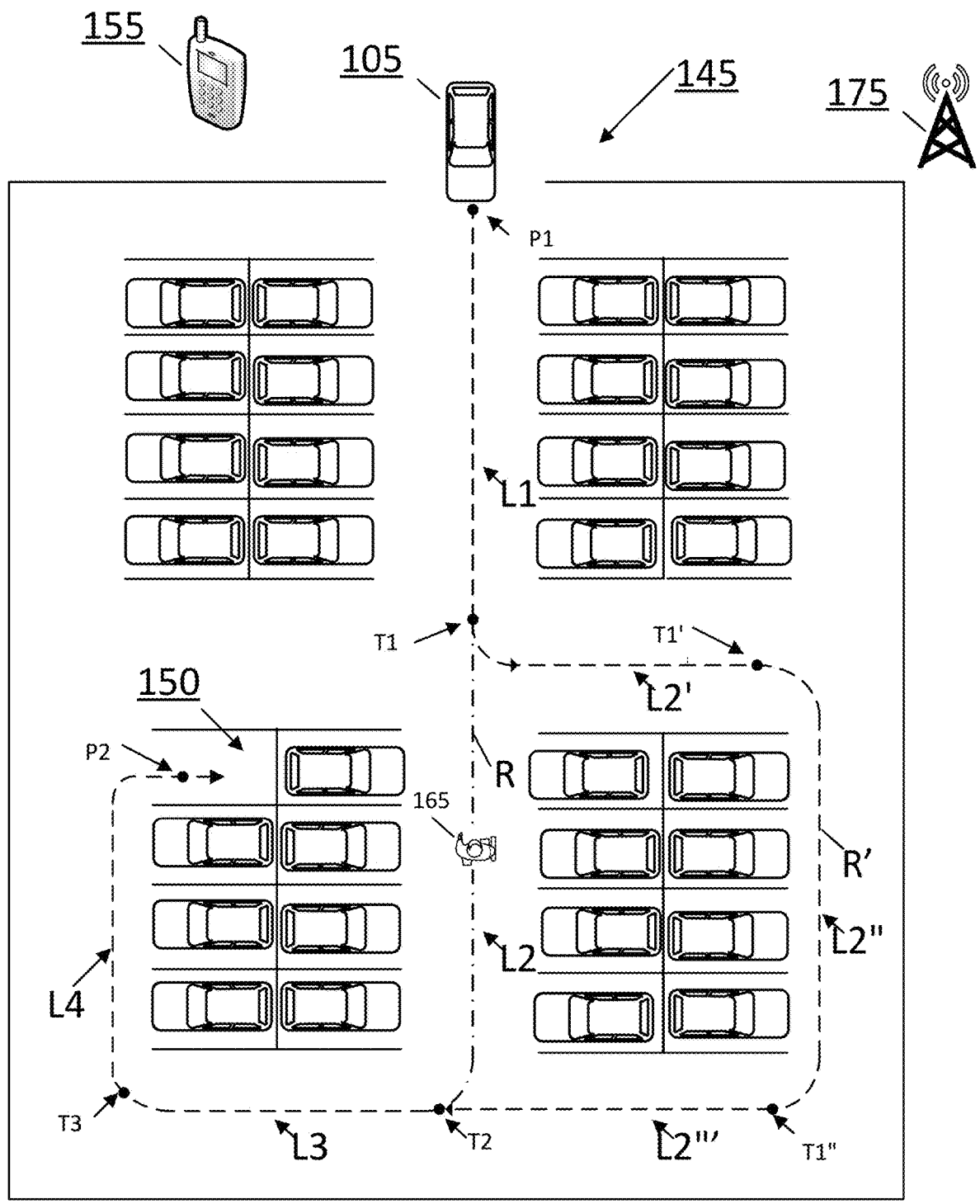
FIG. 3 is a diagram illustrating operating the vehicle along an updated route based on identification of an obstacle in an original route.

FIG. 3 is a diagram illustrating a vehicle 105 operating within the predetermined area 145 that includes parking spaces for a vehicle 105. When the request from the user has been received in the vehicle computer 110, like in the example of FIG. 2, the route R is determined for the vehicle 105 to move from the first location P1 to the second location P2. As illustrated in FIG. 3, an obstacle 165 may be detected along the route R to the second location P2. In the example shown in FIG. 3, the obstacle 165 is a human walking in the predetermined area 145. The obstacle 165 may be any type of physical object, e.g., a human, an animal, another vehicle 105, a tree limb, etc.

The obstacle 165 may be identified in any suitable way, e.g., using conventional object detection techniques by which a vehicle computer 110 can interpret data from vehicle sensors 115. For example, the vehicle sensors 115 may detect the obstacle 165 as the vehicle 105 is moving along the route R. Alternatively or additionally, infrastructure sensors 160 may provide data to identify a location of an obstacle 165 along the route R as the vehicle 105 moves.

In the event that an obstacle 165 is detected along the route R, the vehicle computer 110 can determine an updated route R to avoid the obstacle 165. In other words, one or more updated routes R can be determined based on obstacles 165 detected along the route R as the vehicle 105 moves. The updated route R is determined in a similar way from the original route R as described above, wherein the updated route R avoids the obstacle 165 detected along the route R.

Because the route R has been changed to the updated route R' based on the location of the obstacle 165, some or all of the waypoints T1, T2, T3 may be changed as well, and/or waypoints may be added or removed. As shown in FIG. 3, the updated route R' includes a first new waypoint T1' and a second new waypoint T1' between the first waypoint T1 and the second waypoint T2. In other words, in this example, three new legs L2', L2", L2'" were added to the updated route R'. In addition to the first new waypoint T1' and the second new waypoint T1', updated predicted travel times are determined that correspond to the new waypoints T1', T1". In the example shown in FIG. 3, an updated predicted travel time is determined between the first waypoint T1 and the first new waypoint T1', an updated predicted travel time is determined between the first new waypoint T1' and the second new waypoint T1", and an updated predicted travel time is determined between the second new waypoint T1" and the third waypoint T3.

After the updated route R' is determined, the vehicle computer 110 may send a route update message specifying the updated route R to the portable device 155 to notify the user that the route R has changed. The new waypoints T1', T1" and the updated predicted travel times corresponding to the new waypoints T1', T1" are typically included in the route update message. The system 100 can predict the location of the vehicle 105 with respect to the updated route R' in a manner described above for determining a vehicle 105 location with respect to the route R. The portable device 155 can determine an updated predicted location of the vehicle 105 based on the updated route R' and the updated predicted travel times in a manner such as described above. Additionally, the portable device 155 may determine a new confidence score based the updated predicted travel time and the elapsed time of travel of the vehicle 105.

Figure 4:
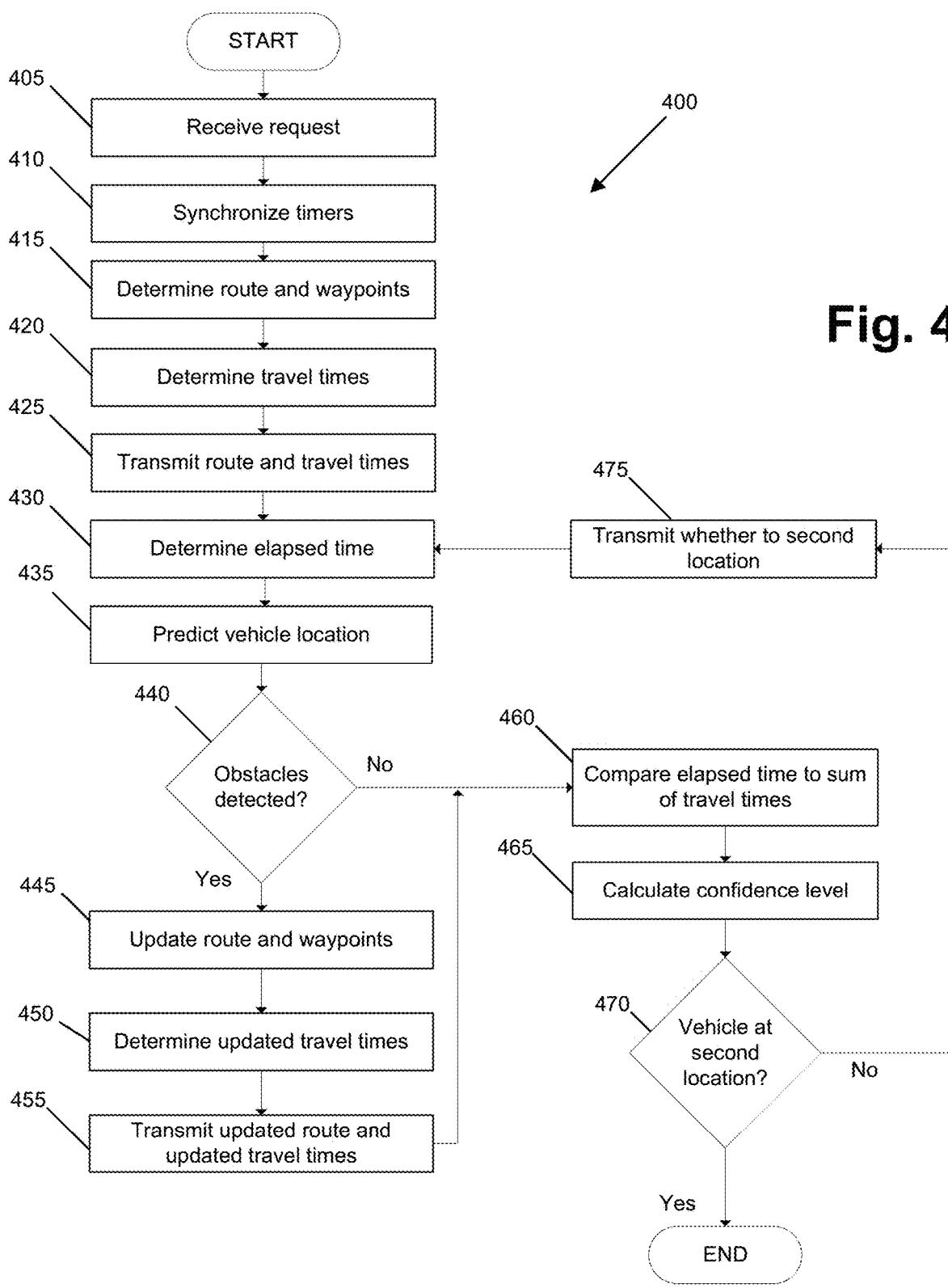
FIG. 4 is a flowchart of an example process for determining a route for the vehicle.

FIG. 4 is a diagram of an example process 400 for determining a route R for the vehicle 105. The process 400 may be carried out according to respective program instructions in the vehicle computer 110 and the portable device 155 as described further below.

The process 400 begins in a block 405. In the block 405, the vehicle computer 110 receives the move request from the portable device 155 to move the vehicle 105 from the first location P1 to the second location P2. For example, a user may submit the move request on the portable device 155, such as on a mobile phone or computer, indicating that the vehicle 105 is ready to move from the first location P1 to the location P2, i.e., from the entrance to the predetermined area 145 to the parking spot in the predetermined area 145 as shown in FIGS. 2 and 3. The vehicle computer 110 can receive the move request and based thereon the vehicle 105 may begin its movement from the first location P1 to the second location P2.

In block 410, the vehicle computer 110 synchronizes timers between the vehicle computer 110 and the portable device 155, as described above. Once the timers are synchronized, the timers may be transmitted to the portable device 155 to be used in later determinations by the portable device 155. For example, as described above, the timers may be used later to determine elapsed time or other times throughout the process 400.

In block 415, the vehicle computer 110 determines a route from the first location P1 to the location P2. The route is the path along which the vehicle 105 moves from the first location P1 to the location P2 and includes legs and waypoints such as described above. In the example above, the route R includes waypoints T1, T2, T3. The waypoints T1, T2, T3 define the legs L1, L2, L3, L4 of the example route R, i.e., the legs L1, L2, L3, L4 are the distances between each of the waypoints T1, T2, T3 along the route R.

In block 420, the vehicle computer 110 determines the predicted travel times between waypoints determined for the route. In the above example, this means that the vehicle computer 110 would determine travel times between each of the waypoints T1, T2, T3 along the route R, i.e., along each leg L1, L2, L3, L4 of the route R. As mentioned above, a total predicted travel time may be determined by summing the predicted travel times for each leg of the route.

In block 425, the vehicle computer 110 transmits the route and the predicted travel times along each leg to the portable device 155. The portable device 155 may display to the user of the portable device 155 the route that the vehicle 105 will be travelling in the predetermined area 145. The portable device 155 may display to the user the predicted travel times along the legs.

In block 430, the portable device 155 determines the elapsed time, based on its synchronized clock with the vehicle computer 110 and the time from when the request was received by the vehicle computer 110, and the vehicle 105 begins to move, to a current time.

In block 435, the portable device 155 predicts the location of the vehicle 105 along the route. The portable device 155 may predict the location of the vehicle 105 based on the elapsed time determined in block 430 and the predicted travel times transmitted from the vehicle computer 110 in block 425. The portable device 155 compares the elapsed time since the vehicle 105 began to move to the predicted travel times between each of the waypoints, e.g., waypoints T1, T2, T3 along the route R, to determine a current location along the route R of the vehicle 105.

In block 440, the vehicle computer 110 determines whether one or more obstacles 165 are present along the route that may obstruct the vehicle 105, e.g., based on data from sensors of the vehicle 105 and/or infrastructure sensors. If no obstacle 165 is determined along the route, the process 400 move to block 460.

In decision block 445, the vehicle computer 110, based on determination of an obstacle 165 along the route of the vehicle 105, determines an updated route with new waypoints along the updated route.

In block 450, the vehicle computer 110 determines updated predicted travel times between new waypoints of the route, e.g., in the above example, waypoints T2', T2" on the updated route R'.

In block 455, the vehicle computer 110 transmits the updated route and the updated predicted travel times to the portable device 155.

In block 460, which may follow the block 440 upon a lack of determination of an obstacle 165 along the route determined in the block 415, or may follow the block 455 upon the vehicle computer 110 transmitting an updated route and updated predicted travel times, the portable device 155 compares the elapsed time that the vehicle 105 has been in motion to the predicted travel times, i.e., either the predicted travel times for the route determined in the block 415 or updated predicted travel times determined for the updated route determined in the block 445.

In block 465, the portable device 155 calculates a confidence score based on the comparison of the elapsed time of travel and the sum of the predicted travel times. For example, as discussed above, as the elapsed time increases, the confidence score may indicate less confidence in the location of the vehicle 105. The confidence score is used to determine the likelihood of the vehicle 105 being at the location that the portable device 155 is predicting.

In block 470, the vehicle computer 110 determines whether the vehicle 105 has reached the destination location, e.g., in the example above, the location P2. In the examples shown in FIGS. 2 and 3, the destination location P2 is a parking spot in the predetermined area 145. If the vehicle 105 has not reached the location P2, the process 400 moves to block 475 for the vehicle computer 110 to transmit that the vehicle 105 has not reached the location P2. If the vehicle 105 reaches the location P2, the process 400 ends.

In block 475, the vehicle computer 110 transmits to the portable device 155 that the vehicle 105 has not reached the location P2. The process 400 continues to block 430 for the portable device 155 to determine the elapsed time and continue with the process 400 until the vehicle 105 has reached the location P2, as determined in block 470.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising:
    a first computer including a first processor and a first memory, the first memory storing first instructions executable by the first processor to:
        receive a request from a second computer to move a vehicle from a first location to a second location within a predetermined area;
        synchronize a first timer stored in the first computer with a second timer stored in the second computer;
        determine a route including one or more waypoints from the first location to the second location;
        determine predicted travel times for a plurality of respective legs of the route, the predicted travel times including a first predicted travel time for a first leg, wherein the first leg is defined from the first location to a first waypoint included in the one or more waypoints; and
        transmit the route and the predicted travel times to the second computer;
    the second computer including a second processor and a second memory, the second memory storing second instructions executable by the processor to:
        determine an elapsed time of travel based on the synchronization of the first timer and the second timer; and
        predict a location of the vehicle based on the elapsed time of travel and the first predicted travel time.

2. The system of claim 1, wherein the second instructions further include instructions to predict the location of the vehicle further based on a second predicted travel time included in the predicted travel times.

3. The system of claim 1, wherein the second instructions further include instructions to:
    compare the elapsed time of travel to a sum of the predicted travel times; and
    calculate a confidence score based on the comparison of the elapsed time of travel and the sum of the predicted travel times.

4. The system of claim 1, wherein the first instructions further include instructions to determine an updated route based on obstacles detected along the route as the vehicle moves.

5. The system of claim 4, wherein the first instructions further include instructions to transmit the updated route to the second computer.

6. The system of claim 4, wherein the first instructions further include instructions to determine updated predicted travel times between the one or more waypoints based on obstacles detected along the route as the vehicle moves.

7. The system of claim 6, wherein the first instructions further include instructions to transmit the updated predicted travel times to the second computer.

8. The system of claim 4, wherein the obstacles are detected by infrastructure sensors in the predetermined area identifying the location of the obstacles.

9. The system of claim 1, wherein the second location is identified by infrastructure sensors in the predetermined area.

10. The system of claim 1, wherein the second location specifies a parking spot.

11. The system of claim 10, wherein the parking spot is specified based on data from infrastructure sensors in the predetermined area.

12. The system of claim 1, wherein the route is determined based on a map of the predetermined area and vehicle sensor data.

13. The system of claim 1, wherein the first instructions further include instructions to determine updated predicted travel times based on obstacles detected along the route as the vehicle moves.

14. The system of claim 13, wherein the first instructions further include instructions to transmit the updated predicted travel times to the second computer.

15. The system of claim 1, wherein the one or more waypoints are determined based on operation of the vehicle.

16. The system of claim 15, wherein the operation of the vehicle includes at least one of turning, accelerating, parking, or stopping of the vehicle.

* * * * *